US007016976B2

(12) United States Patent
Merrells et al.

(10) Patent No.: US 7,016,976 B2
(45) Date of Patent: Mar. 21, 2006

(54) UNIQUEID-BASED ADDRESSING IN A DIRECTORY SERVER

(75) Inventors: John Merrells, Mountain View, CA (US); Olga Natkovich, Sunnyvale, CA (US); Gordon Good, Mountain View, CA (US); Mark C. Smith, Saline, MI (US)

(73) Assignee: Sun Microsystems, Inc., Santa Clara, CA (US)

( * ) Notice: Subject to any disclaimer, the term of this patent is extended or adjusted under 35 U.S.C. 154(b) by 790 days.

(21) Appl. No.: 09/871,457

(22) Filed: May 31, 2001

(65) Prior Publication Data

US 2002/0184230 A1    Dec. 5, 2002

(51) Int. Cl.
G06F 15/16    (2006.01)
(52) U.S. Cl. ............... 709/245; 709/202; 709/203; 707/1; 707/2; 707/3; 707/100; 707/101; 707/102; 707/104.3
(58) Field of Classification Search ..... 707/100–104.1, 707/1–3, 10; 709/212, 217, 202–203, 245
See application file for complete search history.

(56) References Cited

U.S. PATENT DOCUMENTS

| 5,117,351 A | * | 5/1992 | Miller ..................... 707/10 |
| 5,774,552 A | | 6/1998 | Grimmer |
| 5,813,008 A | * | 9/1998 | Benson et al. ............... 707/10 |
| 6,154,776 A | * | 11/2000 | Martin ..................... 709/226 |
| 6,157,942 A | | 12/2000 | Chu et al. |
| 6,366,954 B1 | * | 4/2002 | Traversat et al. ........... 709/220 |
| 6,539,379 B1 | * | 3/2003 | Vora et al. ..................... 707/6 |
| 6,547,829 B1 | * | 4/2003 | Meyerzon et al. ........ 715/501.1 |
| 6,785,686 B1 | * | 8/2004 | Boreham et al. ........... 707/102 |
| 2003/0067912 A1 | * | 4/2003 | Mead et al. ................. 370/389 |

OTHER PUBLICATIONS

Website Information: "Mission Statement" of The Open Group, updated Feb. 22, 2001 with "Corporate Overview", updated Apr. 6, 2001, 5 pages.
Online Publication: "Universal Unique Identifier", Copyright 1997, 6 pages.
Website Information from Internet RFC/STD/FYI/BCP Archives, "RFC1321" by R. Rivest, MIT Laboratory for Computer Science and RSA Data Security, Inc. dated Apr., 1992, 16 pages.

\* cited by examiner

Primary Examiner—Bharat Barot
Assistant Examiner—Shawki S. Ismail
(74) Attorney, Agent, or Firm—Osha Liang LLP

(57) ABSTRACT

A method of addressing an entry in a directory server including generating a unique identifier for the entry, creating an encoded address by encoding the unique identifier into a distinguished name, and specifying the entry using the encoded address for a plurality of operations. A method of addressing an entry in a directory server, including generating a unique identifier for the entry, creating an encoded address by encoding the unique identifier into a control, and specifying the entry using the encoded address for a plurality of operations. A unique identifier-based addressing system for a directory server, including a unique identifier generated for an entry and an encoded address created by encoding the unique identifier into a distinguished name. The entry is specified using the encoded address for a plurality of operations.

16 Claims, 12 Drawing Sheets

| Open Digital Marketplaces/Applications 40 |

| Portal Services 42 |
|---|
| Knowledge Management 50 | Security 52 | Personalization 54 | Aggregation 56 | Presentation 58 |

| Communication Services 44 |
|---|
| Web Mail 60 | Calendar 62 | Wireless 64 | Instant Messaging 66 | Unified Messaging 68 |

| Web, Application, and Integration Services 46 |
|---|
| Web Server 70 | Application Server 72 | B2B Integration 74 | EAI Integration 76 | Business Process Automation 78 |

| Unified User Management Services 48 |
|---|
| Directory Server 80 | Meta Directory 82 | Delegated Administration 84 | PKI 86 | Policy 88 |

28 Internet Service Deployment Platform

| Operating System 30 |

| Network & Systems Infrastructure 32 |

*(PRIOR ART)*
*FIGURE 2*

Entry 124

| Attribute Type 120 | Attribute Values 122 |
|---|---|
| cn: | Barbara Jensen<br>Babs Jensen |
| sn: | Jensen |
| telephonenumber: | +1 408 555 1212 |
| mail: | babs@airius.com |

UNIQUEID-BASED ADDRESSING IN A DIRECTORY SERVER

BACKGROUND OF INVENTION

The most fundamental program resident on any computer is the operating system (OS). Various operating systems exist in the market place, including Solaris™ from Sun Microsystems Inc., Palo Alto, Calif. (Sun Microsystems), MacOS from Apple Computer, Inc., Cupertino, Calif., Windows NT®, from Microsoft Corporation, Redmond, Wash., UNIX, and Linux. The combination of an OS and its underlying hardware is referred to herein as a "traditional platform". Prior to the popularity of the Internet, software developers wrote programs specifically designed for individual traditional platforms with a single set of system calls and, later, application program interfaces (APIs). Thus, a program written for one platform could not be run on another. However, the advent of the Internet made cross-platform compatibility a necessity and a broader definition of a platform has emerged. Today, the original definition of a traditional platform (OS/hardware) dwells at the lower layers of what is commonly termed a "stack," referring to the successive layers of software required to operate in the environment presented by the Internet and World Wide Web.

Prior art FIG. 1 illustrates a conceptual arrangement wherein a first computer (2) running the Solaris™ platform and a second computer (4) running the Windows® NT platform are connected to a server (8) via the Internet (6). A resource provider using the server (8) might be any type of business, governmental, or educational institution. The resource provider (8) needs to be able to provide its resources to both the user of the Solaris™ platform and the user of the Windows® 98 platform, but does not have the luxury of being able to custom design its content for the individual traditional platforms.

Effective programming at the application level requires the platform concept to be extended all the way up the stack, including all the new elements introduced by the Internet. Such an extension allows application programmers to operate in a stable, consistent environment.

iPlanet™ E-commerce Solutions, a Sun Microsystems|Netscape Alliance, has developed a net-enabling platform shown in FIG. 2 called the Internet Service Deployment Platform (ISDP) (28). ISDP (28) gives businesses a very broad, evolving, and standards-based foundation upon which to build an e-enabled solution.

ISDP (28) incorporates all the elements of the Internet portion of the stack and joins the elements seamlessly with traditional platforms at the lower levels. ISDP (28) sits on top of traditional operating systems (30) and infrastructures (32). This arrangement allows enterprises and service providers to deploy next generation platforms while preserving "legacy-system" investments, such as a mainframe computer or any other computer equipment that is selected to remain in use after new systems are installed.

ISDP (28) includes multiple, integrated layers of software that provide a full set of services supporting application development, e.g., business-to-business exchanges, communications and entertainment vehicles, and retail Web sites. In addition, ISDP (28) is a platform that employs open standards at every level of integration enabling customers to mix and match components. ISDP (28) components are designed to be integrated and optimized to reflect a specific business need. There is no requirement that all solutions within the ISDP (28) are employed, or any one or more is exclusively employed.

In a more detailed review of ISDP (28) shown in FIG. 2, the iPlanet™ deployment platform consists of the several layers. Graphically, the uppermost layer of ISDP (28) starts below the Open Digital Marketplace/Application strata (40).

The uppermost layer of ISDP (28) is a Portal Services Layer (42) that provides the basic user point of contact, and is supported by integration solution modules such as knowledge management (50), personalization (52), presentation (54), security (56), and aggregation (58).

Next, a layer of specialized Communication Services (44) handles functions such as unified messaging (68), instant messaging (66), web mail (60), calendar scheduling (62), and wireless access interfacing (64).

A layer called Web, Application, and Integration Services (46) follows. This layer has different server types to handle the mechanics of user interactions, and includes application and Web servers. Specifically, iPlanet™ offers the iPlanet™ Application Server (72), Web Server (70), Process Manager (78), Enterprise Application and Integration (EAI) (76), and Integrated Development Environment (IDE) tools (74).

Below the server strata, an additional layer called Unified User Management Services (48) is dedicated to issues surrounding management of user populations, including Directory Server (80), Meta-directory (82), delegated administration (84), Public Key Infrastructure (PKI) (86), and other administrative/access policies (88). The Unified User Management Services layer (48) provides a single solution to centrally manage user account information in extranet and e-commerce applications. The core of this layer is iPlanet™ Directory Server (80), a Lightweight Directory Access Protocol (LDAP)-based solution that can handle more than 5,000 queries per second.

iPlanet™ Directory Server (iDS) provides a centralized directory service for an intranet or extranet while integrating with existing systems. The term directory service refers to a collection of software, hardware, and processes that store information and make the information available to users. The directory service generally includes at least one instance of the iDS and one or more directory client programs. Client programs can access names, phone numbers, addresses, and other data stored in the directory.

One common directory service is a Domain Name System (DNS) server. The DNS server maps computer host names to IP addresses. Thus, all of the computing resources (hosts) become clients of the DNS server. The mapping of host names allows users of the computing resources to easily locate computers on a network by remembering host names rather than numerical Internet Protocol (IP) addresses. The DNS server only stores two types of information, but a typical directory service stores virtually unlimited types of information.

The iDS is a general-purpose directory that stores all information in a single, network-accessible repository. The iDS provides a standard protocol and application programming interface (API) to access the information contained by the iDS.

The iDS provides global directory services, meaning that information is provided to a wide variety of applications. Until recently, many applications came bundled with a proprietary database. While a proprietary database can be convenient if only one application is used, multiple databases become an administrative burden if the databases manage the same information. For example, in a network that supports three different proprietary e-mail systems where each system has a proprietary directory service, if a user changes passwords in one directory, the changes are not automatically replicated in the other directories. Managing multiple instances of the same information results in increased hardware and personnel costs.

The global directory service provides a single, centralized repository of directory information that any application can access. However, giving a wide variety of applications access to the directory requires a network-based means of communicating between the numerous applications and the single directory. The iDS uses LDAP to give applications access to the global directory service.

LDAP is the Internet standard for directory lookups, just as the Simple Mail Transfer Protocol (SMTP) is the Internet standard for delivering e-mail and the Hypertext Transfer Protocol (HTTP) is the Internet standard for delivering documents. Technically, LDAP is defined as an on-the-wire bit protocol (similar to HTTP) that runs over Transmission Control Protocol/Internet Protocol (TCP/IP). LDAP creates a standard way for applications to request and manage directory information.

X.500 and X.400 are the corresponding Open Systems Interconnect (OSI) standards. LDAP supports a X.500 Directory Access Protocol (DAP) capabilities and can easily be embedded in lightweight applications (both client and server) such as email, web browsers, and groupware. LDAP originally enabled lightweight clients to communicate with X.500 directories. LDAP offers several advantages over DAP, including that LDAP runs on TCP/IP rather than the OSI stack, LDAP makes modest memory and CPU demands relative to DAP, and LDAP uses a lightweight string encoding to carry protocol data instead of the highly structured and costly X.500 data encodings.

An LDAP-compliant directory, such as the iDS, leverages a single, master directory that owns all user, group, and access control information. The directory is hierarchical, not relational, and is optimized for reading, reliability, and scalability. This directory becomes the specialized, central repository that contains information about objects and provides user, group, and access control information to all applications on the network. For example, the directory can be used to provide information technology managers with a list of all the hardware and software assets in a widely spanning enterprise. Most importantly, a directory server provides resources that all applications can use, and aids in the integration of these applications that have previously functioned as stand-alone systems. Instead of creating an account for each user in each system the user needs to access, a single directory entry is created for the user in the LDAP directory. FIG. 3 shows a portion of a typical directory with different entries corresponding to real-world objects. The directory depicts an organization entry (90) with the attribute type of domain component (dc), an organizational unit entry (92) with the attribute type of organizational unit (ou), a server application entry (94) with the attribute type of common name (cn), and a person entry (96) with the attribute type of user ID (uid). All entries are connected by the directory.

Understanding how LDAP works starts with a discussion of an LDAP protocol. The LDAP protocol is a message-oriented protocol. The client constructs an LDAP message containing a request and sends the message to the server. The server processes the request and sends a result, or results, back to the client as a series of LDAP messages. Referring to FIG. 4, when an LDAP client (100) searches the directory for a specific entry, the client (100) constructs an LDAP search request message and sends the message to the LDAP server (102) (step 104). The LDAP server (102) retrieves the entry from the database and sends the entry to the client (100) in an LDAP message (step 106). A result code is also returned to the client (100) in a separate LDAP message (step 108).

LDAP-compliant directory servers like the iDS have nine basic protocol operations, which can be divided into three categories. The first category is interrogation operations, which include search and compare operators. These interrogation operations allow questions to be asked of the directory. The LDAP search operation is used to search the directory for entries and retrieve individual directory entries. No separate LDAP read operation exists. The second category is update operations, which include add, delete, modify, and modify distinguished name (DN), i.e., rename, operators. A DN is a unique, unambiguous name of an entry in LDAP. These update operations allow the update of information in the directory. The third category is authentication and control operations, which include bind, unbind, and abandon operators.

The bind operator allows a client to identify itself to the directory by providing an identity and authentication credentials. The DN and a set of credentials are sent by the client to the directory. The server checks whether the credentials are correct for the given DN and, if the credentials are correct, notes that the client is authenticated as long as the connection remains open or until the client re-authenticates. The unbind operation allows a client to terminate a session. When the client issues an unbind operation, the server discards any authentication information associated with the client connection, terminates any outstanding LDAP operations, and disconnects from the client, thus closing the TCP connection. The abandon operation allows a client to indicate that the result of an operation previously submitted is no longer of interest. Upon receiving an abandon request, the server terminates processing of the operation that corresponds to the message ID.

In addition to the three main groups of operations, the LDAP protocol defines a framework for adding new operations to the protocol via LDAP extended operations. Extended operations allow the protocol to be extended in an orderly manner to meet new marketplace needs as they emerge.

A typical complete LDAP client/server exchange might proceed as depicted in FIG. 5. First, the LDAP client (100) opens a TCP connection to the LDAP server (102) and submits the bind operation (step 111). This bind operation includes the name of the directory entry that the client wants to authenticate as, along with the credentials to be used when authenticating. Credentials are often simple passwords, but they might also be digital certificates used to authenticate the client (100). After the directory has verified the bind credentials, the directory returns a success result to the client (100) (step 112). Then, the client (100) issues a search request (step 113). The LDAP server (102) processes this request, which results in two matching entries (steps 114 and 115). Next, the LDAP server (102) sends a result message (step 116). The client (100) then issues the unbind request (step 117), which indicates to the LDAP server (102) that the client (100) wants to disconnect. The LDAP server (102) obliges by closing the connection (step 118).

By combining a number of these simple LDAP operations, directory-enabled clients can perform useful, complex tasks. For example, an electronic mail client can look up mail recipients in a directory, and thereby, help a user address an e-mail message.

The basic unit of information in the LDAP directory is an entry, a collection of information about an object. Entries are composed of a set of attributes, each of which describes one particular trait of an object. Attributes are composed of an attribute type (e.g., common name (cn), surname (sn), etc.) and one or more values. FIG. 6 shows an exemplary entry (124) showing attribute types (120) and values (122). Attributes may have constraints that limit the type and length of data placed in attribute values (122). A directory schema places restrictions on the attribute types (120) that must be, or are allowed to be, contained in the entry (124).

SUMMARY OF INVENTION

In general, in one aspect, the present invention involves a method of addressing an entry in a directory server comprising generating a unique identifier for the entry, creating an encoded address by encoding the unique identifier into a distinguished name, and specifying the entry using the encoded address for a plurality of operations.

In general, in one aspect, the present invention involves a method of addressing an entry in a directory server, comprising generating a unique identifier for the entry, creating an encoded address by encoding the unique identifier into a control, and specifying the entry using the encoded address for a plurality of operations.

In general, in one aspect, the present invention involves a unique identifier-based addressing system for a directory server, comprising a unique identifier generated for an entry and an encoded address created by encoding the unique identifier into a distinguished name. The entry is specified using the encoded address for a plurality of operations.

In general, in one aspect, the present invention involves a unique identifier-based addressing system for a directory server, comprising means for generating a unique identifier for an entry, means for creating an encoded address by encoding the unique identifier with a control, and means for specifying the entry using the encoded address for a plurality of operations.

In general, in one aspect, the present invention involves a unique identifier-based addressing system for a directory server, comprising means for generating a unique identifier for an entry, means for creating an encoded address by encoding the unique identifier into a distinguished name, and means for specifying the entry using the encoded address for a plurality of operations.

Other aspects and advantages of the invention will be apparent from the following description and the appended claims.

BRIEF DESCRIPTION OF DRAWINGS

FIG. 2 illustrates a block diagram of iPlanet™ Internet Service Development Platform.

FIG. 6 illustrates a directory entry showing attribute types and values.

DETAILED DESCRIPTION

Figure 1:
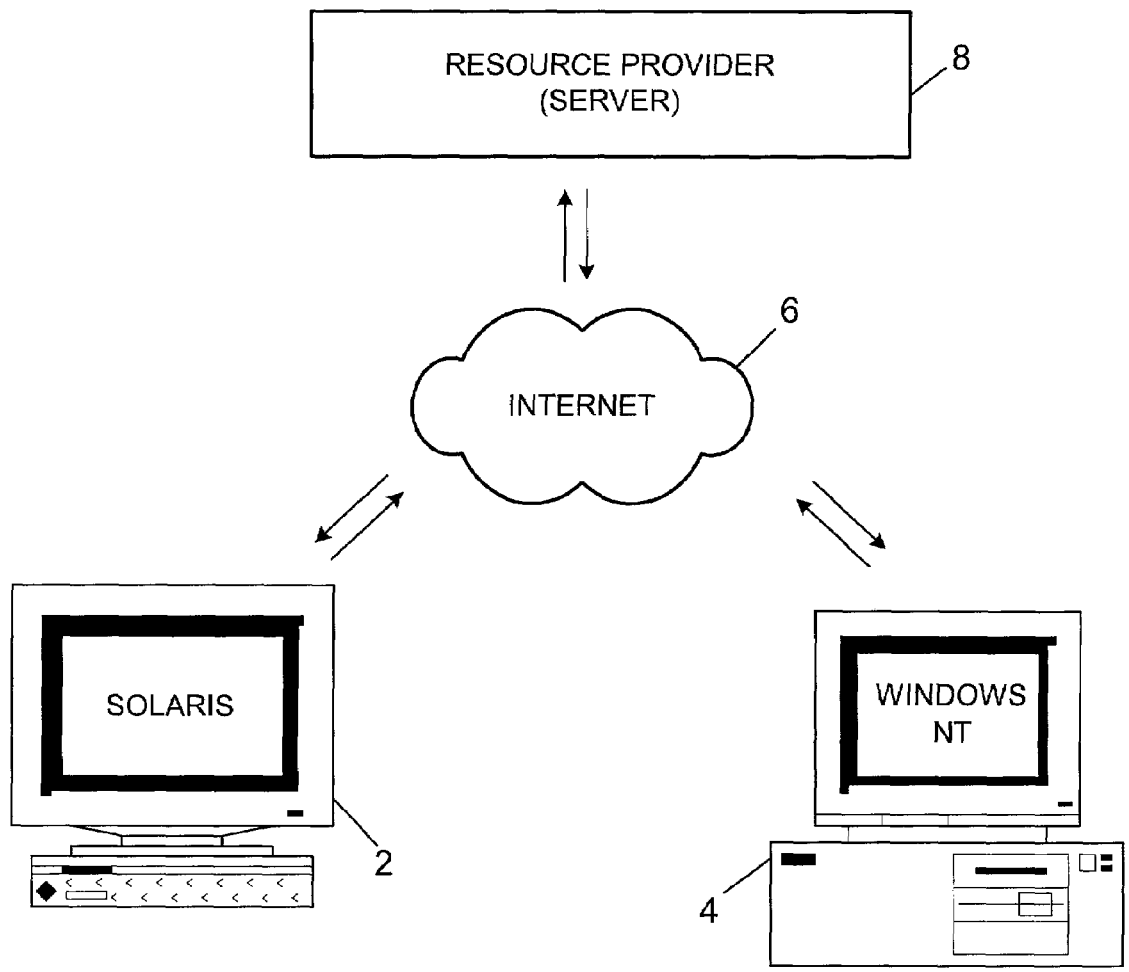
FIG. 1 illustrates a multiple platform environment.
Figure 3:
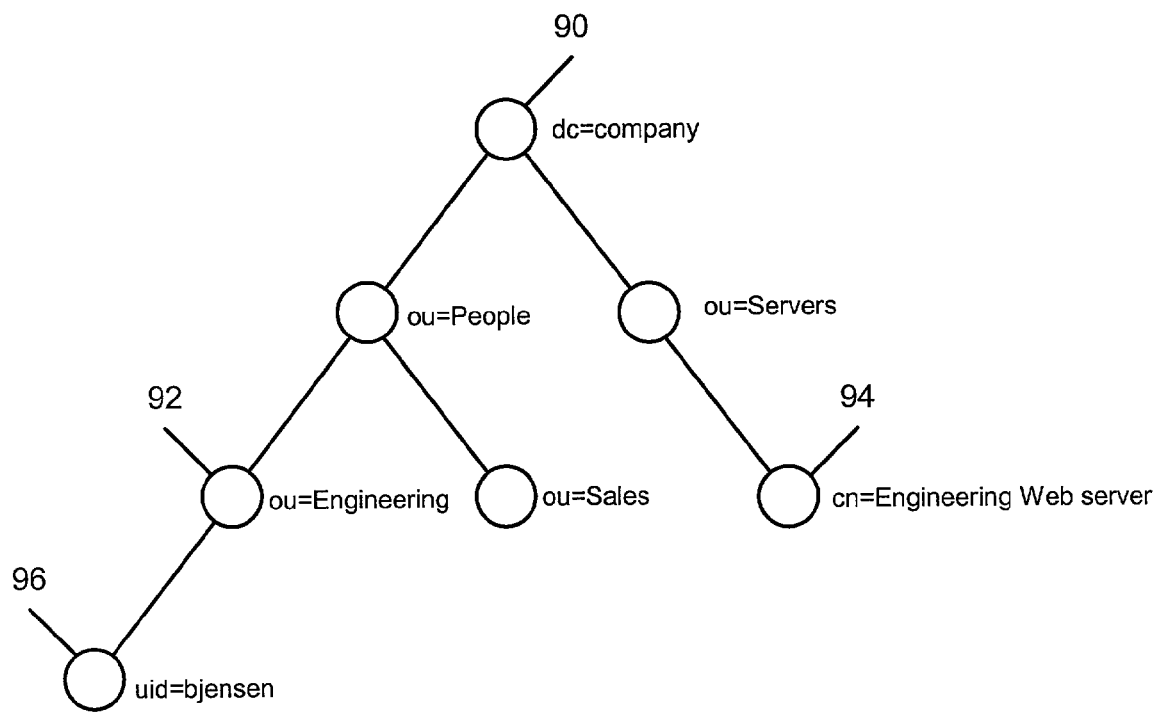
FIG. 3 illustrates part of a typical directory.
Figure 4:
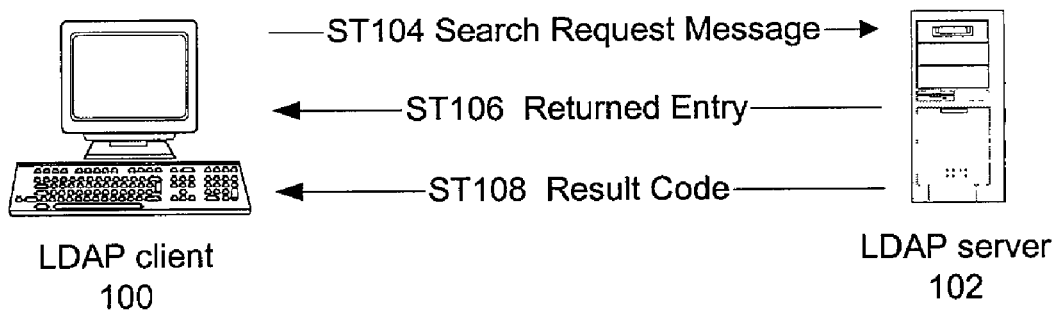
FIG. 4 illustrates the LDAP protocol used for a simple request.
Figure 5:
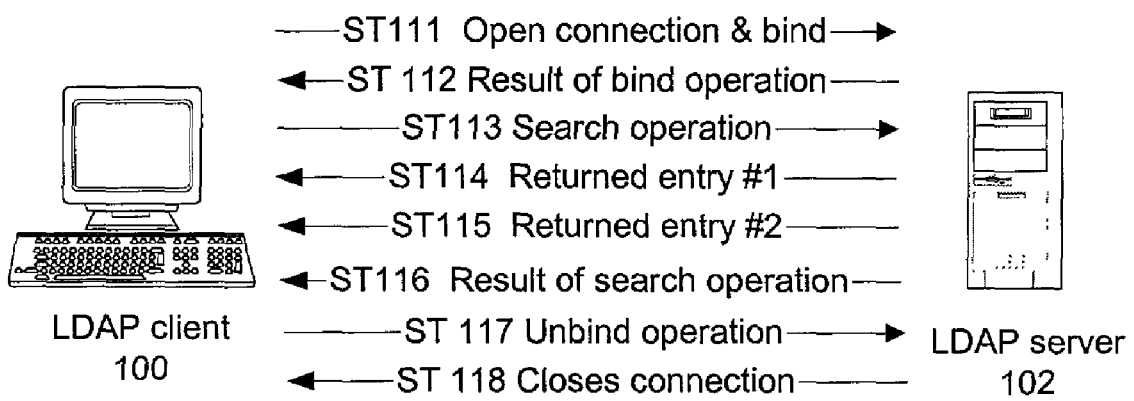
FIG. 5 illustrates a typical LDAP exchange between the LDAP client and LDAP server.

Specific embodiments of the invention will now be described in detail with reference to the accompanying figures. Like elements in the various figures are denoted by like reference numerals for consistency.

Figure 7:
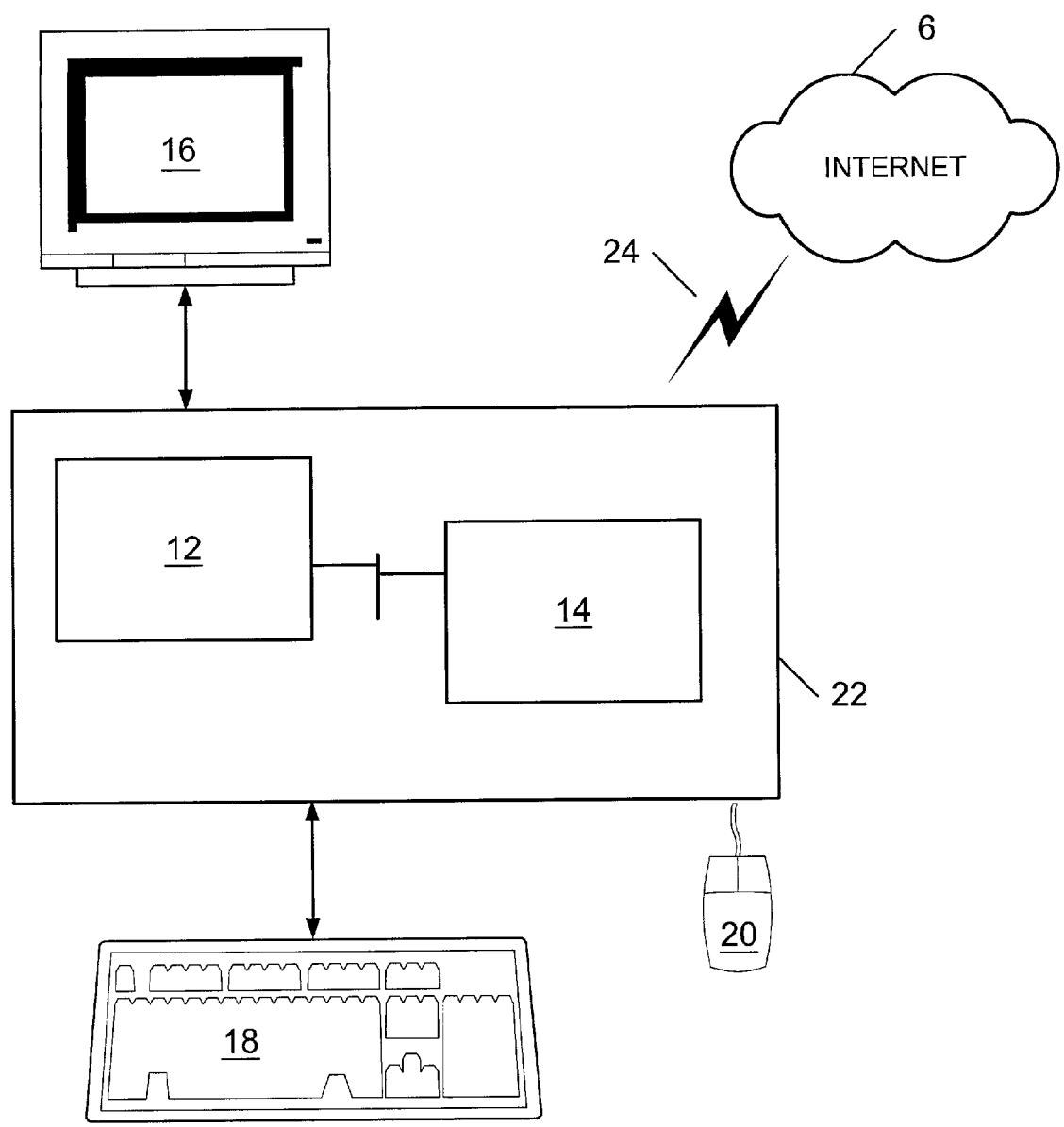
FIG. 7 illustrates a typical computer with components.

The invention described here may be implemented on virtually any type computer regardless of the traditional platform being used. For example, as shown in FIG. 7, a typical computer (22) has a processor (12), associated storage element (14), among others. The computer (22) has associated therewith input means such as a keyboard (18) and a mouse (20), although in an accessible environment these input means may take other forms. The computer (22) is also associated with an output device such as a display (16), which also may take a different form in a given accessible environment. Computer (22) is connected via a connection means (24) to the Internet (6).

Directory servers have been used as a corporate infrastructure component for over a decade. The directory server concept has evolved substantially over this time. Today, the directory industry roughly comprises three major categories: Network Operating Systems (NOS) Directories, Meta-directories, and Application Directories.

Figure 8:
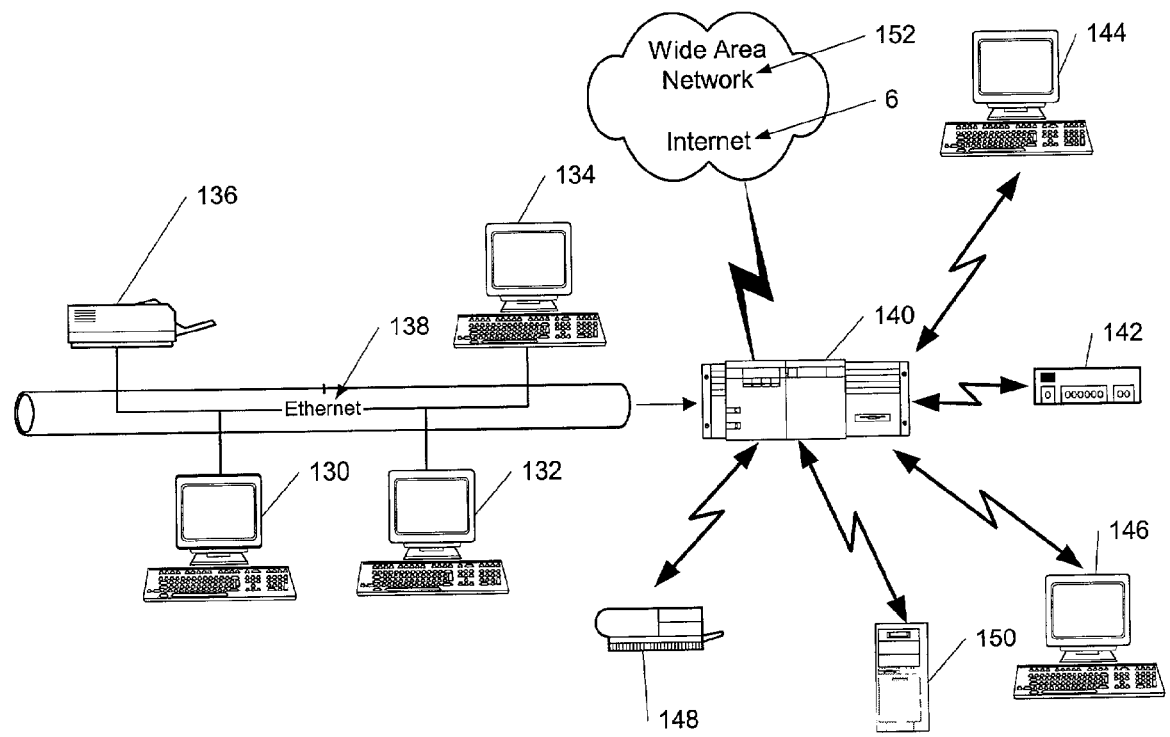
FIG. 8 illustrates a typical networked workgroup.

NOS directories are the oldest. These directories serve as information storage systems for the NOS. NOS directories are designed to support print-sharing and file-sharing requirements for small to medium-sized networked workgroups as shown in FIG. 8. The network workgroup shows a first client (130), a second client (132), a third client (134), and a shared printer (136) with an Ethernet connection (138) at one location. Using a router (140), a connection is made to a remote network via a hub (142). Connected to the hub (142) is a remote shared printer (148), a first remote client (144), a second remote client (146), and a file server (150). The entire networked workgroup is able to connect to a wide area network (152) or the Internet (6) via the router (140). NOS directories are also integrated with the operating system. Typical NOS directories include Microsoft® NT Domain Directory and Active Directory for Windows® 2000, Novell Directory Services (NDS), and Sun Microsystems Network Information Service (NIS) for UNIX.

The creation of Meta-directories is a result of the increase in requirement of the directory server from the explosion of e-mail communication. Meta-directories use standard protocols and proprietary connections for synchronizing e-mail systems. However, Meta-directories go beyond e-mail synchronization. Meta-directories integrate key legacy data-systems into a standards-based directory for use by one or more corporate Intranet applications.

Application directories store user information, such as employee, partner, vendor, and customer information, in a single repository for access by multiple applications across multiple heterogeneous systems for up to millions of users. Application directories provide storage for user information, user authentication and access control, and provide the foundation for security for many Internet applications. The primary purpose of the application directory is to support Intranet and E-commerce applications. Application directories serve this role by having such features as Meta-directory capabilities, high-performance, scalability and reliability.

iPlanet™ Directory Server (iDS) is a type of application directory that delivers user-management infrastructure for managing large volumes of user information for e-business applications and services. The iDS provides global directory services by providing information to a wide variety of applications. Until recently, many applications came bundled with their own proprietary databases. However, as discussed above, while a proprietary database can be convenient for a one application environment, multiple databases become an administrative burden if they manage the same information.

The global directory service provides a single, centralized repository of directory information that any application can access. However, giving a wide variety of applications access to the directory requires a network-based means of communicating between the applications and the directory. The iDS uses LDAP to give applications access to the global directory service.

Historically, directory server used the DN to identify and retrieve the entry in the directory. However, when a update function is performed on a DN, the DN changes. Consider the following example. Two clients are updating the same directory entry at about the same time. One of the clients adds an attribute while another renames the entry. If the modify operation reaches the server after the rename operation, modify operation fails since a target DN contained by the operation is stale. If the client had an ability to use a Unique Identifier (UniqueID) of an entry, this problem would be avoided because UniqueID is assigned to an entry once and never changes. Thus, UniqueID provides a good way to unambiguously refer to an entry in a distributed or replicated environment.

Multi-master replication is a replication model where updates are applied on multiple servers. Multi-master replication comes in two flavors: synchronous and asynchronous. In the case of synchronous multi-master replication, an update is applied only after all updateable servers are notified. With asynchronous multi-master replication, entries can be written and updated on any of several updateable replica without requiring communication with other updateable replicas before a write or update operation is performed. As found in the iDS, multi-master replication requires directory entries to be unabmiguously identified, even in the presence of renaming operations. Therefore, UniqueID-based addressing becomes critical for iDS to work properly when multi-master replication occurs. Consider a second, similar example where two masters are also present. The entry is renamed on one master and modified on the other master. When renaming operation is replayed to the second master, the operation succeeds resulting in the desirable state. But when the modify operation is replayed to the first master, the operation fails because the entry with supplied DN no longer exists. As a result, two masters end up in a different state. On the other hand, if the entry had been specified by UniqueID rather that the DN, both operations succeed resulting in a consistent state across servers.

Understanding UniqueID-based addressing starts by defining UniqueID. UniqueID is a 136 bit number with the first octet set to the identifier type and the remaining bits set to the identifier itself. In an embodiment of this invention, the first octet is set to zero which results in the remaining 16 octets (128 bits) being generated in accordance with UUID specification. UUID stands for Universal Unique Identifier and refers to a specification published by Open Group. Further discussion about Open Group is beyond the scope of this discussion. For more information, see http://www.opengroup.org/overview/who_we_are.htm. Further discussion about UUID is beyond the scope of this discussion. For more information, see http://www.opengroup.org/onlinepubs/9629399/apdxa.htm.

The first step to establishing UniqueID-based addressing for iPlanet™ Directory Server is to generate UniqueID for each entry. One implementation of UniqueID generation supports both time-based and name-based UUIDs. Time-based generation is an ID generated based on a current system time and is globally unique. Name-based generation is based on a byte stream called "name." Time-based IDs are most common. The name-based IDs are useful if the same set of UniqueIDs need to be generated independently on two separate systems. In an embodiment of this invention, the UniqueID generated does not guarantee uniqueness, but makes repetition very unlikely.

Figure 9:
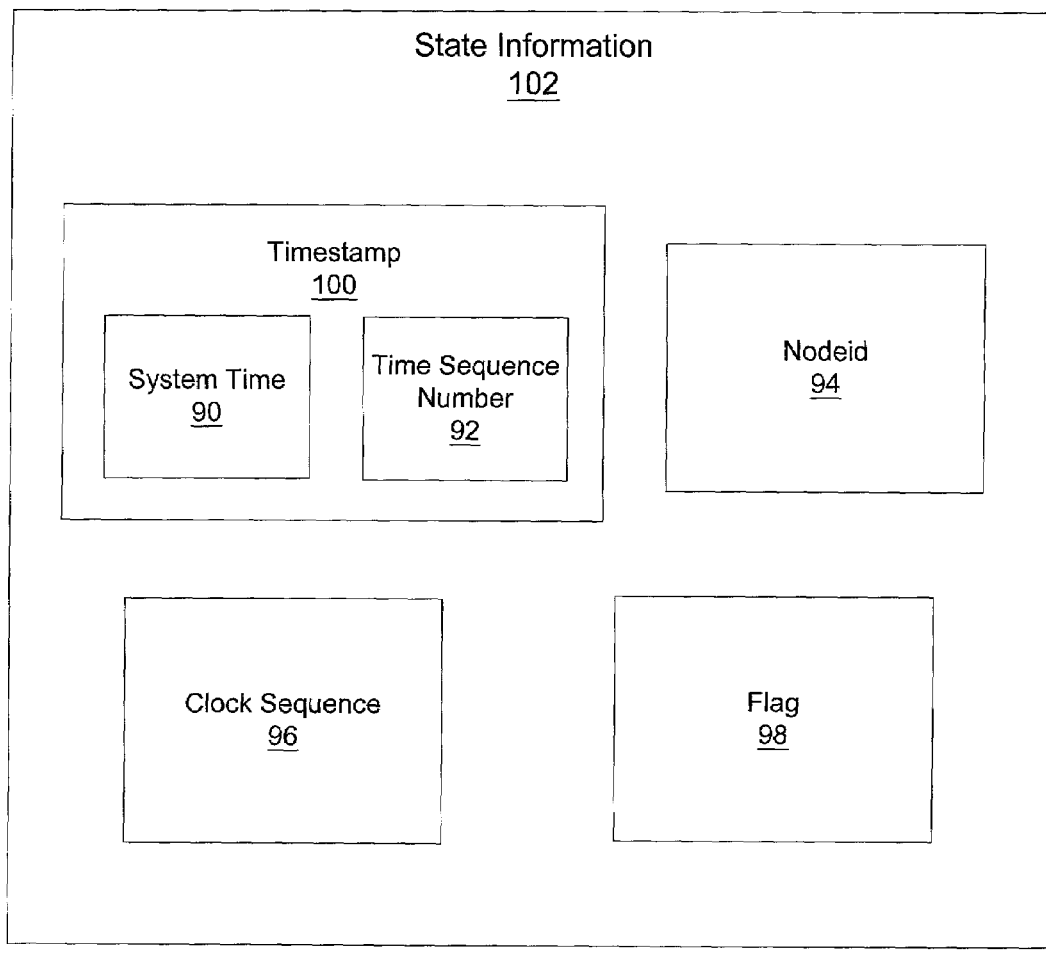
FIG. 9 illustrates a block diagram of state information in one embodiment of the invention.

Referring to FIG. 9, the UniqueID generator maintains state information (102) including a system time (90), a time sequence number (92), a nodeid (94), a clock sequence (96), and a flag (98). A timestamp portion (100) of the state includes two parts, namely system time (90) obtained through a call to time plus time sequence number (92) that keeps IDs generated within the exact same second distinct. Up to $10^7$ IDs can be generated per second. The timestamp (100) is a 60 bit value in Universal Time Coordinate (UTC) as a count of 100 nanosecond intervals since 00:00:00.00, Oct. 15, 1582 (date of Gregorian reform to the Christian calendar) that differentiates IDs generated on a same system. Nodeid (94) is designed to differentiate between IDs generated on different systems. Clock sequence (96) is used to ensure uniqueness if clock is set back or nodeid (94) has changed. The flag (98) indicates whether the state information has been saved during server shutdown.

State information is stored persistently either in a file or in a directory entry as a single binary attribute. The state information is read into memory during startup and written back to memory during shutdown. The first time UniqueID generator is started, state time is set to current system time, time sequence is set to zero, nodeid is set to cryptographic strength random number, clock sequence is set to a random number. If disorderly shutdown is detected during server startup, the clock sequence is set to a random number to reduce risk of duplicates.

The implementation of UniqueID generator uses randomly generated nodeid rather than a Network Information Center (NIC) address. If NIC is used, the state information is required to be shared among all servers running on the same host causing a significant reduction in performance.

Figure 10:
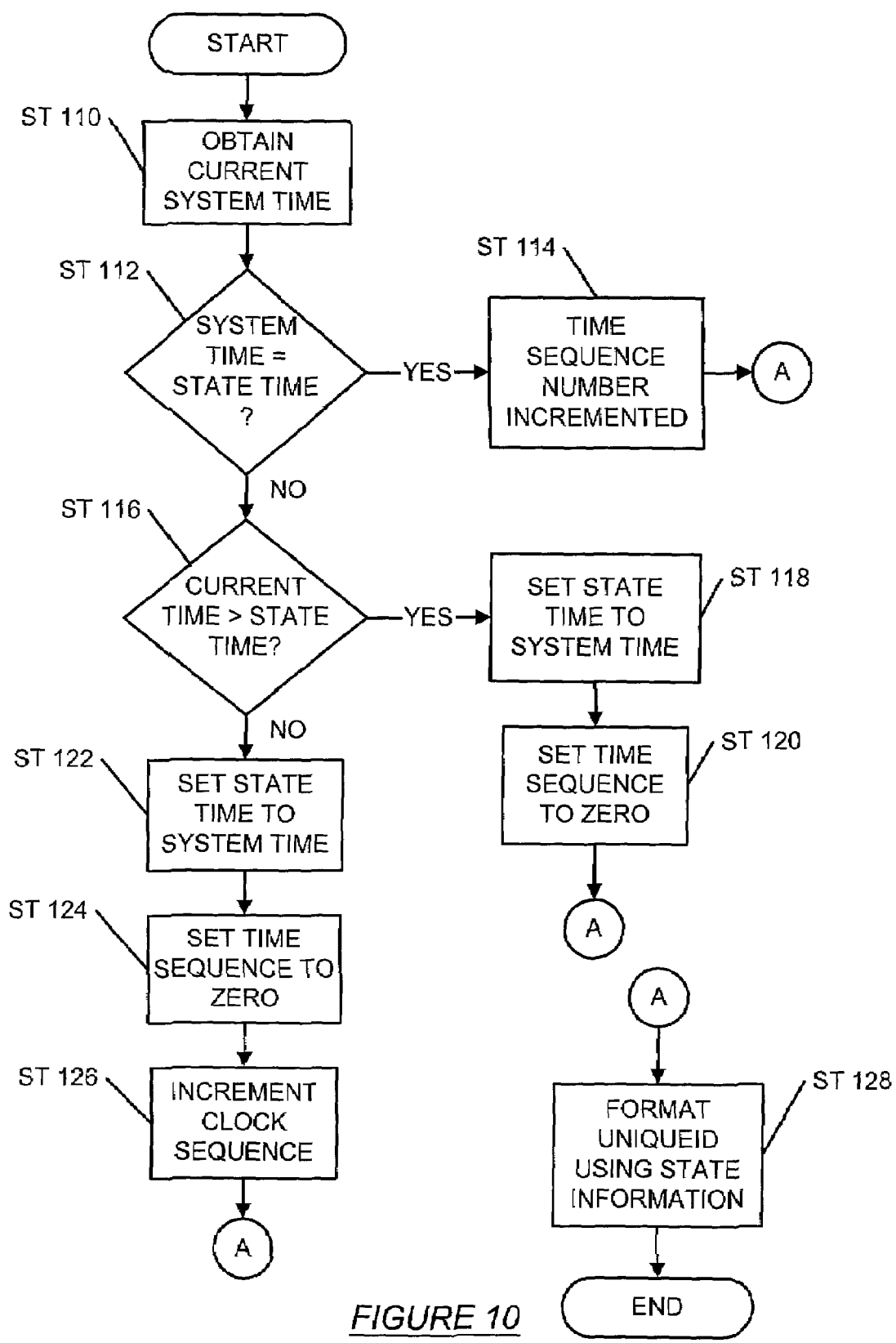
FIG. 10 illustrates a flowchart of a time-based, single-threaded generation algorithm in one embodiment of the invention.

Two different types of time-based generation algorithms include a single-threaded generation and a multi-threaded generation. The single-threaded generation has the following steps as shown in FIG. 10. First, obtain current system time (step 110). If current system time equals state time (step 112), then the time sequence number is incremented (step 114). If not, if the current time is greater than state time (step 116), then set state time to system time (step 118) and set time sequence to zero (step 120). If not, set state time to system time (step 122), set time sequence to zero (step 124), and increment clock sequence (step 126). Next, format UniqueID using state information (step 128).

Figure 11:
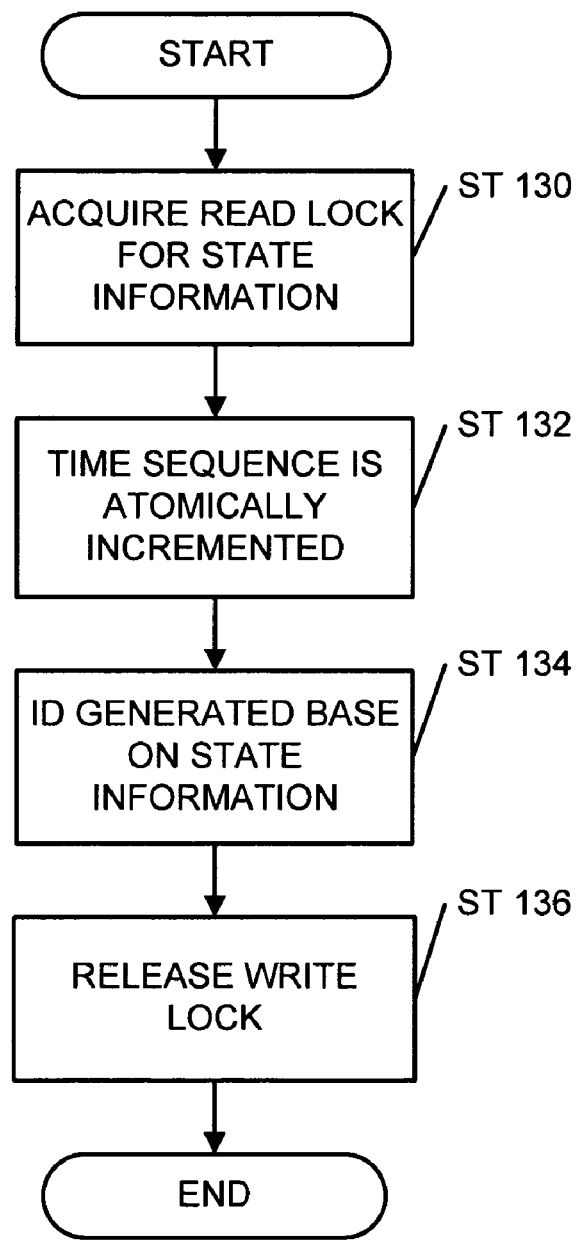
FIG. 11 illustrates a flowchart of a time-based, multi-threaded generation algorithm focusing on the generator task in one embodiment of the invention.
Figure 12:
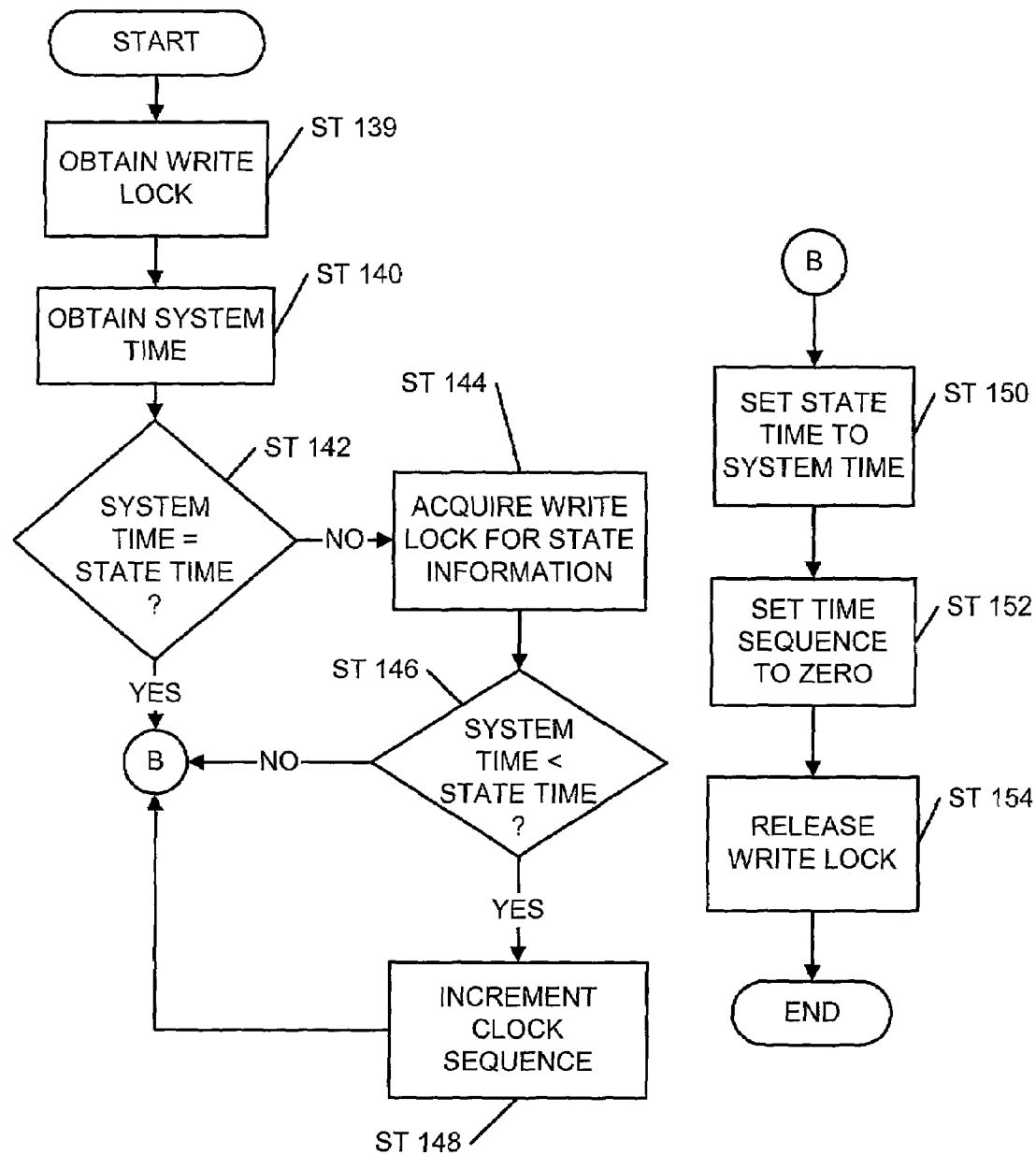
FIG. 12 illustrates a flowchart of a time-based, multi-threaded generation algorithm focusing on the update task in one embodiment of the invention.

The multi-threaded generation algorithm includes two separate tasks. A generator task is executed for each generated ID, an update task is executed periodically to update state information. Referring to FIG. 11, the generator task starts by acquiring read lock for state information (step 130). Read lock prevents updating of the state information data until read is unlocked. Next, time sequence is atomically incremented (i.e., the value is correctly incremented in a multi-threaded environment without interference by other threads) (step 132). The ID is generated based on the state information (step 134) followed by releasing read lock (step 136). As shown in FIG. 12, the update task starts with obtaining a a write lock (step 139) to prevent other threads from reading or modifying state information. Next, system time is obtained (step 140). If system state does not equal state time (step 142), then acquire write lock for state information (step 144). Write lock prevents writing of the state information data until write is unlocked. If system time is less than state time (step 146), then increment clock sequence number (step 148). Next, set state time to system time (step 150). Then, set time sequence to zero (step 152) followed by releasing write lock (step 154).

Name-based generation algorithm takes a UUID that differentiates name spaces and a byte stream to generate MD5 digest of the data. Given the same namespace UUID and the same input stream, a same UniqueID is generated. MD5 digest is a 128 bit value computed from an arbitrary sized input stream using MD5 digest algorithm described in RFC 1321. Given the same input the algorithm is guaranteed to produce the same result. Further discussion of MD5 Digest is beyond the scope of this discussion, however more information may be found at http://www.faqs.org/rfcs/rfc1321.html.

Random generation algorithm takes a UUID that is randomly generated using physical source of randomness or cryptographic strength random number generator.

Once UniqueID is generated, a method of addressing UniqueID is necessary to be able to specify the entry by UniqueID for search, delete, modify and rename operations. Because the only way to address an entry for delete, modrdn or modify operation is through the DN, at least two options exist. The first option is to modify target DN to include addressing information. The second option is to define a new control to carry the addressing information.

Modifying the target DN by encoding addressing information starts by reserving some of the DN namespace for alternative addressing mechanisms. The general form of the addressing string is: <unique attribute value assertion, [<dn>|<databaseid>], addressingmechanism=OID (where OID is a unique identifier assigned to objects). Examples of encoding addressing information in the DN follow. First, a situation where address by UniqueID and backend is unknown is represented by UniqueID=<uuid>, addressingmechanism=<oid>. Second, a situation where address by UniqueID, DN provided to as a hint of which backend is represented by UniqueID=<uuid>, <DN>, addressingmechanism=<oid>. Third, a situation where address by UniqueID, database id uniquely indentifies the backend is represented by UniqueID=<uuid>, databaseid=<genid>, addressingmechanism=<oid>. Many variations of this theme exists, but the idea of using the OID to select the addressing mechanisms make it extensible.

An advantage of the encoding addressing information approach is the allowance of a uniform addressing scheme where the entry is always addressed by the DN. Normal LDAP operations can be used to locate an entry based on the entry's UniqueID.

The second option is defining a control that contains addressing scheme OID and addressing data. As an example, each UniqueID-based search contains OID of the addressing scheme, UniqueID of the requested entry and a flag telling the server whether DN should be used as a hint or ignored altogether. The advantage of this option is no changes are required to LDAP specification.

Applications of UniqueID-based addressing is utilized by the following operations. Replicated modify, delete, and modrdn operation are replayed using UniqueID-based addressing. Also, UniqueID-based addressing may be beneficial for non-replicated operations. The implementation details depend on the addressing scheme selected. Operations originated at the replication module use target DN or serverID as the base of the address. Using serverID is more efficient if the entry has been deleted because the serverID prevents searching multiple backends.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method of addressing an entry in a directory server, comprising:
   generating a unique identifier for the entry;
   creating an encoded address by encoding the unique identifier into a distinguished name;
   specifying the entry using the encoded address for a plurality of operations;
   wherein the unique identifier comprises a multi-bit number having a first octet set to zero and a plurality of remaining octets set to an identifier generated in accordance with a unique identifier specification; and
   wherein generating the unique identifier is time-based comprising a single-threaded generation algorithm and a multi-threaded generation algorithm.

2. The method of claim 1, wherein the unique identifier comprises a multi-bit number having a first octet set to an identifier type and a plurality of remaining bits set to an identifier.

3. The method of claim 1, wherein the multi-threaded generation comprises an update task and a generator task.

4. The method of claim 1, wherein generating the unique identifier is name-based.

5. The method of claim 1, wherein generating the unique identifier is random-based.

6. A method of addressing an entry in a directory server, comprising:
   generating a unique identifier for the entry;
   creating an encoded address by encoding the unique identifier into a control;
   specifying the entry using the encoded address for a plurality of operations;
   wherein the unique identifier comprises a multi-bit number having a first octet set to zero and a plurality of remaining octets set to an identifier generated in accordance with a unique identifier specification; and
   wherein generating the unique identifier is time-based comprising a single-threaded generation algorithm and a multi-threaded generation algorithm.

7. The method of claim 6, wherein the unique identifier comprises a multi-bit number having a first octet set to an identifier type and a plurality of remaining bits set to an identifier.

8. The method of claim 6, wherein the multi-threaded generation comprises an update task and a generator task.

9. The method of claim 6, wherein generating the unique identifier is name-based.

10. The method of claim 6, wherein generating the unique identifier is random-based.

11. A unique identifier-based addressing system for a directory server, comprising:
- a unique identifier generated for an entry;
- an encoded address created by encoding the unique identifier into a distinguished name;
- wherein the entry is specified using the encoded address for a plurality of operations;
- wherein the unique identifier comprises a multi-bit number having a first octet set to zero and a plurality of remaining octets set to an identifier generated in accordance with a unique identifier specification; and
- wherein generating the unique identifier is time-based comprising a single-threaded generation algorithm and a multi-threaded generation algorithm.

12. The system of claim 11, wherein the unique identifier comprises a multi-bit number having a first octet set to an identifier type and a plurality of remaining bits set to an identifier.

13. A unique identifier-based addressing system for a directory server, comprising:
- a unique identifier generated for an entry;
- an encoded address created by encoding the unique identifier into a control;
- wherein the entry is specified using; the encoded address for a plurality of operations;
- wherein the unique identifier comprises a multi-bit number having a first octet set to zero and a plurality of remaining octets set to an identifier generated in accordance with a unique identifier specification; and
- wherein generating the unique identifier is time-based comprising single-threaded generation algorithm and a multi-threaded generation algorithm.

14. The system of claim 13, wherein the unique identifier comprises a multi-bit number having a first octet set to an identifier type and a plurality of remaining bits set to an identifier.

15. A unique identifier-based addressing system for a directory server, comprising:
- means for generating a unique identifier for an entry;
- means for creating an encoded address by encoding the unique identifier with a control;
- means for specifying the entry using the encoded address for a plurality of operations;
- wherein the unique identifier comprises a multi-bit number having a first octet set to zero and a plurality of remaining octets set to an identifier generated in accordance with a unique identifier specification; and
- wherein generating the unique identifier is time-based comprising a single-threaded generation algorithm and a multi-threaded generation algorithm.

16. A unique identifier-based addressing system for a directory server, comprising:
- means for generating a unique identifier for an entry;
- means for creating an encoded address by encoding the unique identifier into a distinguished name;
- means for specifying the entry using the encoded address for a plurality of operations;
- wherein the unique identifier comprises a multi-bit number having a first octet set to zero and a plurality of remaining octets set to an identifier generated in accordance with a unique identifier specification; and
- wherein generating the unique identifier is time-based comprising a single-threaded generation algorithm and a multi-threaded generation algorithm.

* * * * *